US008142747B2

(12) United States Patent
Andreasson et al.

(10) Patent No.: US 8,142,747 B2
(45) Date of Patent: Mar. 27, 2012

(54) CATALYTIC REDUCTION OF $NO_x$

(76) Inventors: Anders Andreasson, Västra Frölunda (SE); Guy Richard Chandler, Cambridge (GB); Claus Friedrich Goersmann, Royston (GB); James Patrick Warren, Cambridge (GB); Georg Huethwohl, Soest (DE)

( * ) Notice: Subject to any disclaimer, the term of this patent is extended or adjusted under 35 U.S.C. 154(b) by 0 days.

(21) Appl. No.: 12/380,414

(22) Filed: Feb. 27, 2009

(65) Prior Publication Data
US 2009/0169451 A1    Jul. 2, 2009

Related U.S. Application Data

(60) Continuation of application No. 10/886,778, filed on Jul. 8, 2004, now Pat. No. 7,498,010, which is a division of application No. 09/601,694, filed as application No. PCT/GB99/00292 on Jan. 28, 1999, now Pat. No. 6,805,849.

(30) Foreign Application Priority Data

Feb. 6, 1998 (GB) .................................. 9802504.2

(51) Int. Cl.
*B01D 53/56* (2006.01)
(52) U.S. Cl. ................ 423/239.1; 423/245.3; 423/215.5
(58) Field of Classification Search ............... 423/213.2, 423/213.5, 239.1, 215.5, 245.3
See application file for complete search history.

(56) References Cited

U.S. PATENT DOCUMENTS

| | | | |
|---|---|---|---|
| 4,231,338 A | 11/1980 | Sugasawa et al. |
| 4,406,126 A | 9/1983 | Yokokura et al. |
| 4,534,173 A | 8/1985 | Tsukamoto |
| 4,854,123 A | 8/1989 | Inoue |
| 4,902,487 A | 2/1990 | Cooper et al. |
| 4,912,776 A | 3/1990 | Alcorn |
| 4,961,917 A | 10/1990 | Byrne |
| 5,041,270 A | 8/1991 | Fujitani et al. |
| 5,050,376 A | 9/1991 | Stiglic et al. |
| 5,369,956 A | 12/1994 | Daudel et al. |
| 5,422,085 A | 6/1995 | Bell et al. |
| 5,440,880 A | 8/1995 | Ceynow et al. |
| 5,564,283 A | 10/1996 | Yano et al. |
| 5,628,186 A | 5/1997 | Schmelz |
| 5,746,989 A | 5/1998 | Murachi et al. |
| 5,785,030 A | 7/1998 | Paas |
| 5,806,308 A | 9/1998 | Khair et al. |
| 6,062,026 A | 5/2000 | Woolenweber et al. |
| 6,240,721 B1 | 6/2001 | Ito et al. |
| 6,301,888 B1 | 10/2001 | Gray, Jr. |
| 6,338,245 B1 | 1/2002 | Shimoda et al. |
| 6,427,436 B1 | 8/2002 | Allansson et al. |
| 6,826,906 B2 | 12/2004 | Kakwani et al. |
| 7,005,116 B2 | 2/2006 | Schäfer-Sindlinger et al. |
| 7,143,578 B2 | 12/2006 | Kakwani et al. |

FOREIGN PATENT DOCUMENTS

| | | |
|---|---|---|
| DE | 4217552 C1 | 8/1993 |
| DE | 4314896 | 11/1993 |
| DE | 4435103 A1 | 4/1996 |
| EP | 487886 | 6/1992 |
| EP | 515857 | 12/1992 |
| EP | 593790 | 4/1994 |
| EP | 615777 A1 | 9/1994 |
| EP | 0758713 A1 | 2/1997 |
| EP | 758713 A1 | 2/1997 |
| JP | 59-87220 | 5/1984 |
| JP | 61-28415 | 2/1986 |
| JP | 62-199121 | 12/1987 |
| JP | 63-38620 | 3/1988 |
| JP | S63-38620 | 3/1988 |
| JP | 63-236522 | 10/1988 |
| JP | 1-318175 | 12/1989 |
| JP | 1-318715 | 12/1989 |
| JP | H2-258016 | 10/1990 |
| JP | 8-8243 | 4/1992 |
| JP | H4-44420 | 4/1992 |
| JP | 5-31327 | 2/1993 |
| JP | 5-65817 | 3/1993 |
| JP | 7-119445 | 5/1995 |
| JP | 8-103636 | 4/1996 |
| JP | 6242935 A | 4/1996 |
| JP | 8-509795 | 10/1996 |
| JP | 9-53442 | 2/1997 |
| JP | 9-85027 | 3/1997 |
| JP | 9-88727 | 3/1997 |
| WO | WO 99/09307 | 2/1999 |
| WO | WO 99/39809 | 8/1999 |

OTHER PUBLICATIONS

Third Party Observation filed in JP 2000-530293 on Jan. 10, 2007.
Third Party Observation filed in JP 2000-530293 on Jan. 30, 2007.
Third Party Observation filed in JP 2000-530293 on Jun. 19, 2007.
Opposition filed in EP 1054722 by DaimlerChrysler on Sep. 5, 2002 (in German).
Opposition filed in EP 1054722 by OMG AG & Co. KG on Sep. 4, 2002.
Response to Oppositions of EP 1054722 filed by Johnson Matthey on Jun. 17, 2003.
Reply to Response to Oppositions of EP 1054722 filed by DaimlerChrysler on Jul. 28, 2003 (in German).
Reply to Response to Oppositions of EP 1054722 filed by Umicore AG & Co. KG (formerly OMG AG & Co. KG) on Sep. 22, 2004.
Response to Summons to Attend Oral Proceedings for EP 1054722 submitted by Johnson Matthey to the European Patent Office on Sep. 5, 2007.
Response to Summons to Attend Oral Proceedings for EP 1054722 submitted by Umicore AG & Co. KG to the European Patent Office on Sep. 12, 2007.

(Continued)

*Primary Examiner* — Edward Johnson
(74) *Attorney, Agent, or Firm* — Capitol City TechLaw PLLC

(57) ABSTRACT

A system for $NO_x$ reduction in combustion gases, especially from diesel engines, incorporates an oxidation catalyst to convert at least a portion of NO to $NO_2$, a particulate filter, a source of reductant such as $NH_3$ and an SCR catalyst. Considerable improvements in $NO_x$ conversion are observed.

17 Claims, 4 Drawing Sheets

OTHER PUBLICATIONS

SAE Paper 952391; "Emissions from Diesel Vehicles with and without Lean NOx and Oxidation Catalysts and Particulate Tape," Oct. 1995.
File memorandum from the HJS Company regarding a visit to PESAG on Aug. 28, 1996.
Letter from the HJS Company to Siemens AG on Jan. 7, 1997.
Letter from the HJS Company to SKW Stickstoffwerke from Feb. 12, 1997.
File memorandum from the HJS Company regarding a project discussion on Jun. 23, 1997 and an attachment.
Discussion minutes of a discussion on Jul. 21, 1997 and a corresponding disclosure.
Letter (grant application) from LVB to the Saxon State Ministry for Labor and Commerce of Jan. 10, 1997 with enclosure "Project description".
Hüthwhol, Maurer, Vogel; "Emissions from Diesel Engines," Der Nahverkehr, 7-8, 1997.
P. Rodenbuesch, "'CRT' and 'SINOx' for reducing truck exhaust gases," Autotechnik, 45.
"Worldwide diesel emission standards, current experiences and future needs." P. Zelenka et al., Applied Catalysis B: Environmental 10 (1998) 3-28.
"Catalytic reduction of nitrogen oxides on mordenite. Some aspect on the mechanism," J.G.M. Brandin et al., Catalysis Today, 4 (1989), 187-203.
SAE 970182, Hawker, P., et al., "Experience with a New Particulate Trap Technology in Europe," 1997.
SAE 890404, Cooper, BJ and Thoss, JE, "Role of NO In Diesel Particulate Emission Control," International Congress and Exposition, Detroit, Michigan, pp. 171-183 (Feb. 27-Mar. 3, 1989).
Letter (regarding funding) from LVB to the Saxon State Ministry for Labor and Commerce of May 12, 1997.
Muller-Hellmann, I., et al., "The Future of Bus Propulsion Technology," Der Nahverhkehr (Local Traffic), May 1998.
Correspondence from Skarupke to Boegner at DaimlerChrysler on Aug. 30, 2002.
Witness Statement of H.T. Vogel on Mar. 9, 2005.
Witness Statement of T.J. Benstead on Sep. 9, 2005.
Presentation titled "The New SCRT System: A Combination of a SCR-Catalyst and a CRT Trap System" from a meeting between HJS and Johnson Matthey on May 27, 1997.
Witness Statement of R.D. O'Sullivan on Sep. 8, 2005.
SAE 86007, Engler, B. et al., "Catalytically Activated Diesel Particulate Traps—New Development and Applications," Feb. 24-28, 1986.
Opposition of EP 1147801B submitted by Johnson Matthey to the European Patent Office on Jun. 14, 2007.
Response to Opposition of EP 1147801B submitted by Umicore AG & Co. KG to European Patent Office on Feb. 28, 2006.
Reply to Summons to Attend Oral Proceedings for EP 1147801B submitted by Johnson Matthey to the European Patent Office on Oct. 13, 2006.
Reply to Summons to Attend Oral Proceedings for EP 1147801B submitted by Umicre AG & Co. KG to the European Patent Office on Oct. 16, 2006.
Response to Umicore's Reply to Summons to Attend Oral Proceedings for EP 1147801B submitted by Johnson Matthey to the European Patent Office on Oct. 19, 2006.
Interlocutory decision by the Chairman in the Opposition Proceedings for EP 1147801B on Dec. 1, 2006.
Grounds of Appeal by Johnson Matthey filed on Apr. 5, 2007 in the European Opposition Proceedings for EP 1147801B.
J.G.M. Brandin, et al., "Catalytic Reduction of Nitrogen Oxides on Mordenite—Some Aspect on the Mechanism," Catalysis Today, 4 (1989), 187-203.
Long, R. Q. and Yang, R. T., "Superior Fe-ZSM-5 Catalyst for Selective Catalytic Reduction of Nitric Oxide by Ammonia," J. Am. Chem. Soc., 121 (1999), 5595-5596.
Long, R.Q. and R.T. Yang, "Catalytic Performance of Fe-ZSM-5 Catalysts for Selective Catalytic Reduction of Nitric Oxide by Ammonia," J. Cat., 188 (1999) 332-339.
Search Results from a Prior Art Search which includes English language abstracts.

Dolling, W., Mathes, W., "The SINOx diesel catalyst. The promising diesel exhaust gas cleaning system for trucks." Technische Ueberwachung (Duesseldorf), 38(7/8), 16-19, 1997 (German language document) with English Abstract.
Hums, E., "Standstill in advanced SCR technology? A provocation for the academic community and catalyst manufacturers," Preprints—American Chemical Society, Division of Petroleum Chemistry, 42(4), 778-780, 1997.
Lange, F.C., et al., "Infrared-spectroscopic investigations of selected catalytic reduction catalysts poisoned with arsenic oxide," Applied Catalysis, B: Environmental, 8(2), 245-265, 1996.
Hums, E. and Spitznagel, G.W. "Deactivation behavior of SCR DeNOx catalysis-basis for the development of a new generation of catalysts," Preprints—American Chemical Society, Division of Petroleum Chemistry, 39(1), 130-6, 1994.
Hilbrig, F., et al., "Acidity of tungsten oxide/titania catalysts for selective catalytic reduction (SCR)," Studies in Surface Science and Catalysis, 75 (New Frontiers in Catalysis, Pt. B.), 1351-62, 1993.
Brief of Daimler Chrysler AG filed with Munich Regional Court 1, Munich, Germany, on Sep. 12, 2005 (Document A of Protest).
Protest Under 37 CFR 1.291(a) by BASF, filed on Jan. 30, 2007.
Jacob, E., et al., "Reduction of NOx from HD Diesel Engines with Urea SCR Compact Systems (Controlled Diesel Catalyst)," Vienna Motor Symposium, May 7-8, 1998, 366-386 with English Abtract.
Notification of Decision in Appeal T 0128/08-3.3.05 regarding counterpart EP Patent No. 1054722.
OA in counterpart Japanese Application No. 2000-530293.
EPO Opposition Filing by Vossius & Partners dated Apr. 22, 2010.
EPO Opposition Filing by Vossius & Partners dated Apr. 22, 2010 (Translation from German to English).
EPO Opposition Filing by Vossius & Partners dated May 12, 2010.
EPO Opposition Filing by Vossius & Partners dated May 12, 2010 (Translation from German to English).
Submission of Publications in connection with JP Pat Appl No. 2000-530293 including JP 1-318715, JP 62-199121, JP 9-85027 and US 4902487.
English translation of Submission of Publications in connection with JP Pat Appl No. 2000-530293 including JP 1-318715, JP 62-199121, JP 9-85027 and US 4902487.
Submission of Publications in connection with JP Pat Appl No. 2000-530293 including JP 9-53442, JP 8-103636, JP 8-8243, JP 63-038620 and EP 758713A1.
English translation of Submission of Publications in connection with JP Pat Appl No. 2000-530293 including JP 9-53442, JP 8-103636, JP 8-8243, JP 63-038620 and EP 758713A1.
Decision of Rejection received in counterpart Japanese Patent Appl. No. 2000-530293 on or about Jul. 6, 2010.
Information Offer Form received in counterpart Japanese Patent Appl. No. 2000-530293 on or about Mar. 11, 2011.
SAE 952489, Litorell, M., et al. "Development of Test Methods for Lean NOx Catalyst Evaluation," Oct. 16-19, 1995, pp. 1-8.
Tuenter, et al., "Kinetics and mechanism of the NOx reduction with NH3 on V2O5-WO3-TiO2 catalyst". Ind. Eng. Chem. Prod. Res. Dev., 25, 1986, 633.
Hans Bosch and Frans Jannsen, "Catalytic Reduction of Nitrogen Oxides—A Review of the Fundamentals and Technology" Catalysis Today, vol. 2, No. 4, Mar. 1988, article which includes pp. 457-487 (Chapter 5).
Heck, R.M., and Farrauto, R.J. "Selective Catalytic Reduction of NOx" Catalytic Air Pollution Control: Commercial Technology, 1995, published by John Wiley & Sons, pp. 156-167.
Garcin, E., et al., "Optimal NOx removal in chemical plants with the HEA-DCN process," Catalysis Today, 17 (1993), 311-324.
Notice of Withdrawal of Complaint filed by DaimlerChrysler with the Munich Regional Court dated Sep. 28, 2006.
Patent Assignment Abstract of Title re: U.S. 6,805,849.
Patent Assignment Abstract of Title re: 2004/0258594.
Assignment document dated Mar. 13, 2006.
Appeal Brief by Umicore AG & Co. KG (Opponent), including Exhibits 1 and 2, filed Apr. 10, 2008 in response to the European Opposition Division's Decision regarding European Patent No. 1054722 (in German with English language translation).

Response by Johnson Matthey PLC et al. (Patent co-Proprietors), including noted Auxiliary Requests and attachments, to the Opponent's Statement on Grounds of Appeal regarding European Patent No. 1054722 (Response filed Aug. 19, 2008).

Mul, Guido, excerpts from the doctoral thesis "Catalytic Diesel Exhaust Purification, A DRIFT Spectroscopic and Mechanistic Study of Soot Oxidation" submitted to the Technical University in Delft in the Netherlands on Mar. 25, 1997.

P. Zelenka, "Abgasnachbehandlung im Hinblick auf die Erfüllng zukünftiger Emissionsgrenzwerte [Exhaust Gas Aftertreatment Systems with Regard to Meeting Future Emissions Limits]" in: Dieselmotoerentechnik 96—Aktueller Stand und Entwicklungstendenzen [Diesel Engine Technology 96—Current Status and Development Trends], Section 14, pp. 216-236, vol. 505, publisher Prof. dr.-lng. Wilfried J. Bartz, Technical Academy Esslingen (in German).

EP1054722 Notification of Decision on Opposition.

Request for review regarding EP 1 054 722 filed Oct. 7, 2009.

English translation of Interrogatory and Report on Reconsideration received on or about Jun. 14, 2011, from the Japanese Patent Office in connection with counterpart application JP Pat. Appl. No. 2000-530293.

Feeley, Jennifer S. et al., "Abatement of NOx from Diesel Engines: Status and Technical Challenges" SAE Technical Paper Series 950747 (1995).

Walker J. et al., "Development of an Ammonia/SCR NOx Reduction System for a Heavy Duty Natural Gas Engine," SAE Technical Paper Series 921673 (1992).

Avila, P. et al., "Catalyst for NOx Removal in Nitric-Acid Plant Gaseous Effluents," Atmospheric Environment, 27A:3 (1993) 443-447.

Kasaoka, Shigeaki et al., "Effect of Inlet No/NO2 Equimolal Ration and Role of Oxygen on Catalytic Reduction of Nitrogen Oxides with Ammonia,"
Journal of Japanese Chemistry, No. 6 (1978) 874-881 (with complete English translation).

Request for Ex Parte Reexamination filed Oct. 5, 2011 for U.S. Patent 7,498,010 to Andreasson et al. (pp. 1-144).

Order Granting Request for Ex Parte Reexamination dated Dec. 9, 2011, issued in connection with Reexamination Application No. 90/011,941 ( U.S. Appl. No. 7,498,010).

Decision on Trial dated Nov. 8, 2011, issued in connection with Trial No. 2010-25115 from Japanese Patent Application No. 2000-530293 (Published as WO 99/39809 and Japanese Patent Laid-Open Publication No. 2002-502927).

English Language Translation of NPL No. 2—Decision on Trial dated Nov. 8, 2011, issued in connection with Trial No. 2010-25115 from Japanese Patent Application No. 2000-530293 (Published as WO 99/39809 abd Japanese Patent Laid-Open Publication No. 2002-502927).

CATALYTIC REDUCTION OF $NO_x$

CROSS REFERENCE TO RELATED APPLICATIONS

This application is continuation of U.S. application Ser. No. 10/886,778, filed Jul. 8, 2004, which is a divisional application of U.S. application Ser. No. 09/601,964, filed Jan. 9, 2001, now U.S. Pat. No. 6,805,849, which is the U.S. National Phase of International Application No. PCT/GB1999/000292, filed Jan. 28, 1999, and which claims the benefit of priority from British Application No. 9802504.2, filed Feb. 6, 1998. These applications, in their entirety, are incorporated herein by reference.

SUMMARY OF THE INVENTION

The present invention concerns improvements in selective catalytic reduction of $NO_x$ in waste gas streams such as diesel engine exhausts or other lean exhaust gases such as from gasoline direct injection (GDI).

BACKGROUND OF THE INVENTION

The technique named SCR (Selective Catalytic Reduction) is well established for industrial plant combustion gases, and may be broadly described as passing a hot exhaust gas over a catalyst in the presence of a nitrogenous reductant, especially ammonia or urea. This is effective to reduce the $NO_x$ content of the exhaust gases by about 20-25% at about 250.degree. C., or possibly rather higher using a platinum catalyst, although platinum catalysts tend to oxidise $NH_3$ to $NO_x$ during higher temperature operation. We believe that SCR systems have been proposed for $NO_x$ reduction for vehicle engine exhausts, especially large or heavy duty diesel engines, but this does require on-board storage of such reductants, and is not believed to have met with commercial acceptability at this time.

We believe that if there could be a significant improvement in performance of SCR systems, they would find wider usage and may be introduced into vehicular applications. It is an aim of the present invention to improve significantly the conversion of $NO_x$ in a SCR system, and to improve the control of other pollutants using a SCR system.

DETAILED DESCRIPTION OF THE INVENTION

Figure 1:
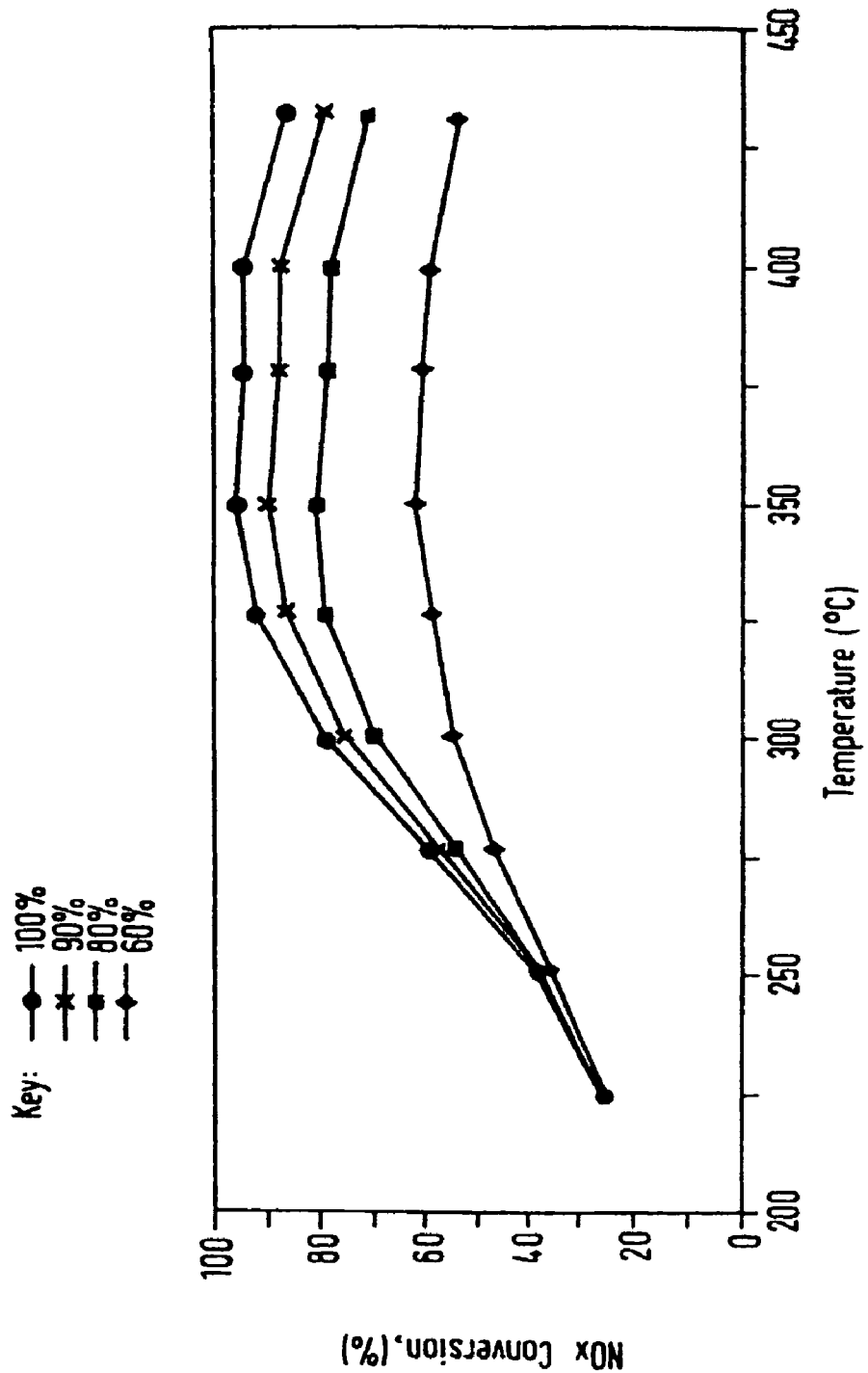
FIG. 1 is a graph plotting percentage $NO_x$ conversion against temperature resulting from Test 1.

Accordingly, the present invention provides an improved SCR catalyst system, comprising in combination and in order, an oxidation catalyst effective to convert NO to $NO_2$, a particulate filter, a source of reductant fluid and downstream of said source, an SCR catalyst.

The invention further provides an improved method of reducing $NO_x$ in gas streams containing NO and particulates comprising passing such gas stream over an oxidation catalyst under conditions effective to convert at least a portion of NO in the gas stream to $NO_2$, removing at least a portion of said particulates, adding reductant fluid to the gas stream containing enhanced $NO_2$ to form a gas mixture, and passing the gas mixture over an SCR catalyst.

Although the present invention provides, at least in its preferred embodiments, the opportunity to reduce very significantly the $NO_x$ emissions from the lean (high in oxygen) exhaust gases from diesel and similar engines, it is to be noted that the invention also permits very good reductions in the levels of other regulated pollutants, especially hydrocarbons and particulates.

The invention is believed to have particular application to the exhausts from heavy duty diesel engines, especially vehicle engines, e.g. truck or bus engines, but is not to be regarded as being limited thereto. Other applications might be LDD (light duty diesel), GDI, CNG (compressed natural gas) engines, ships or stationary sources. For simplicity, however, the majority of this description concerns such vehicle engines.

We have surprisingly found that a "pre-oxidising" step, which is not generally considered necessary because of the low content of CO and unburnt fuel in diesel exhausts, is particularly effective in increasing the conversion of $NO_x$ to $N_2$ by the SCR system. We also believe that minimising the levels of hydrocarbons in the gases may assist in the conversion of NO to $NO_2$. This may be achieved catalytically and/or by engine design or management. Desirably, the $NO_2$/NO ratio is adjusted according to the present invention to the most beneficial such ratio for the particular SCR catalyst and CO and hydrocarbons are oxidized prior to the SCR catalyst. Thus, our preliminary results indicate that for a transition metal/zeolite SCR catalyst it is desirable to convert all NO to $NO_2$, whereas for a rare earth-based SCR catalyst, a high ratio is desirable providing there is some NO, and for other transition metal-based catalysts gas mixtures are notably better than either substantially only NO or $NO_2$. Even more surprisingly, the incorporation of a particulate filter permits still higher conversions of $NO_x$.

The oxidation catalyst may be any suitable catalyst, and is generally available to those skilled in art. For example, a Pt catalyst deposited upon a ceramic or metal through-flow honeycomb support is particularly suitable. Suitable catalysts are e.g. Pt/A12O3 catalysts, containing 1-150 g Pt/ft.sup.3 (0.035-5.3 g Pt/litre) catalyst volume depending on the $NO_2$/NO ratio required. Such catalysts may contain other components providing there is a beneficial effect or at least no significant adverse effect.

The source of reductant fluid conveniently uses existing technology to inject fluid into the gas stream. For example, in the tests for the present invention, a mass controller was used to control supply of compressed $NH_3$, which was injected through an annular injector ring mounted in the exhaust pipe. The injector ring had a plurality of injection ports arranged around its periphery. A conventional diesel fuel injection system including pump and injector nozzle has been used to inject urea by the present applicants. A stream of compressed air was also injected around the nozzle; this provided good mixing and cooling.

The reductant fluid is suitably $NH_3$, but other reductant fluids including urea, ammonium carbamate and hydrocarbons including diesel fuel may also be considered. Diesel fuel is, of course, carried on board a diesel-powered vehicle, but diesel fuel itself is a less selective reductant than $NH_3$ and is presently not preferred.

Suitable SCR catalysts are available in the art and include Cu-based and vanadia-based catalysts. A preferred catalyst at present is a $V_2O_5/WO_3/TiO_2$ catalyst, supported on a honeycomb through-flow support. Although such a catalyst has shown good performance in the tests described hereafter and is commercially available, we have found that sustained high temperature operation can cause catalyst deactivation. Heavy duty diesel engines, which are almost exclusively turbocharged, can produce exhaust gases at greater than 500° C. under conditions of high load and/or high speed, and such temperatures are sufficient to cause catalyst deactivation. In one embodiment of the invention, therefore, cooling means is provided upstream of the SCR catalyst. Cooling means may suitably be activated by sensing high catalyst temperatures or by other, less direct, means, such as determining conditions likely to lead to high catalyst temperatures. Suitable cooling means include water injection upstream of the SCR catalyst, or air injection, for example utilising the engine turbocharger to provide a stream of fresh intake air by-passing the engine. We have observed a loss of activity of the catalyst, however, using water injection, and air injection by modifying the turbocharger leads to higher space velocity over the catalyst which tends to reduce $NO_x$ conversion. Preferably, the preferred SCR catalyst is maintained at a temperature from 160° C. to 450° C.

We believe that in its presently preferred embodiments, the present invention may depend upon an incomplete conversion of NO to $NO_2$. Desirably, therefore, the oxidation catalyst, or the oxidation catalyst together with the particulate trap if used, yields a gas stream entering the SCR catalyst having a ratio of NO to $NO_2$ of from about 4:1 to about 1:3 by volume, for the commercial vanadia-type catalyst. As mentioned above, other SCR catalysts perform better with different $NO/NO_2$ ratios. We do not believe that it has previously been suggested to adjust the $NO/NO_2$ ratio in order to improve $NO_x$ reduction.

The present invention incorporates a particulate trap downstream of the oxidation catalyst. We discovered that soot-type particulates may be removed from a particulate trap by "combustion" at relatively low temperatures in the presence of $NO_2$. In effect, the incorporation of such a particulate trap serves to clean the exhaust gas of particulates without causing accumulation, with resultant blockage or back-pressure problems, whilst simultaneously reducing a proportion of the $NO_x$. Suitable particulate traps are generally available, and are desirably of the type known as wall-flow filters, generally manufactured from a ceramic, but other designs of particulate trap, including woven knitted or non-woven heat-resistant fabrics, may be used.

It may be desirable to incorporate a clean-up catalyst downstream of the SCR catalyst, to remove any $NH_3$ or derivatives thereof which could pass through unreacted or as by-products. Suitable clean-up catalysts are available to the skilled person.

A particularly interesting possibility arising from the present invention has especial application to light duty diesel engines (car and utility vehicles) and permits a significant reduction in volume and weight of the exhaust gas aftertreatment system, in a suitable engineered system.

EXAMPLES

Several tests have been carried out in making the present invention. These are described below, and are supported by results shown in graphical form in the attached drawings.

A commercial 10 litre turbocharged heavy duty diesel engine on a test-bed was used for all the tests described herein.

Test 1—(Comparative)

A conventional SCR system using a commercial $V_2O_5/WO_3/TiO_2$ catalyst, was adapted and fitted to the exhaust system of the engine. $NH_3$ was injected upstream of the SCR catalyst at varying ratios. The $NH_3$ was supplied from a cylinder of compressed gas and a conventional mass flow controller used to control the flow of $NH_3$ gas to an experimental injection ring. The injection ring was a 10 cm diameter annular ring provided with 20 small injection ports arranged to inject gas in the direction of the exhaust gas flow. $NO_x$ conversions were determined by fitting a $NO_x$ analyser before and after the SCR catalyst and are plotted against exhaust gas temperature in FIG. 1. Temperatures were altered by maintaining the engine speed constant and altering the torque applied.

A number of tests were run at different quantities of $NH_3$ injection, from 60% to 100% of theoretical, calculated at 1:1 $NH_3/NO$ and 4:3 $NH_3/NO_2$. It can readily be seen that at low temperatures, corresponding to light load, conversions are about 25%, and the highest conversions require stoichiometric (100%) addition of $NH_3$ at catalyst temperatures of from 325 to 400° C., and reach about 90%. However, we have determined that at greater than about 70% of stoichiometric $NH_3$ injection, $NH_3$ slips through the SCR catalyst unreacted, and can cause further pollution problems.

Test 2 (Comparative)

Figure 2:
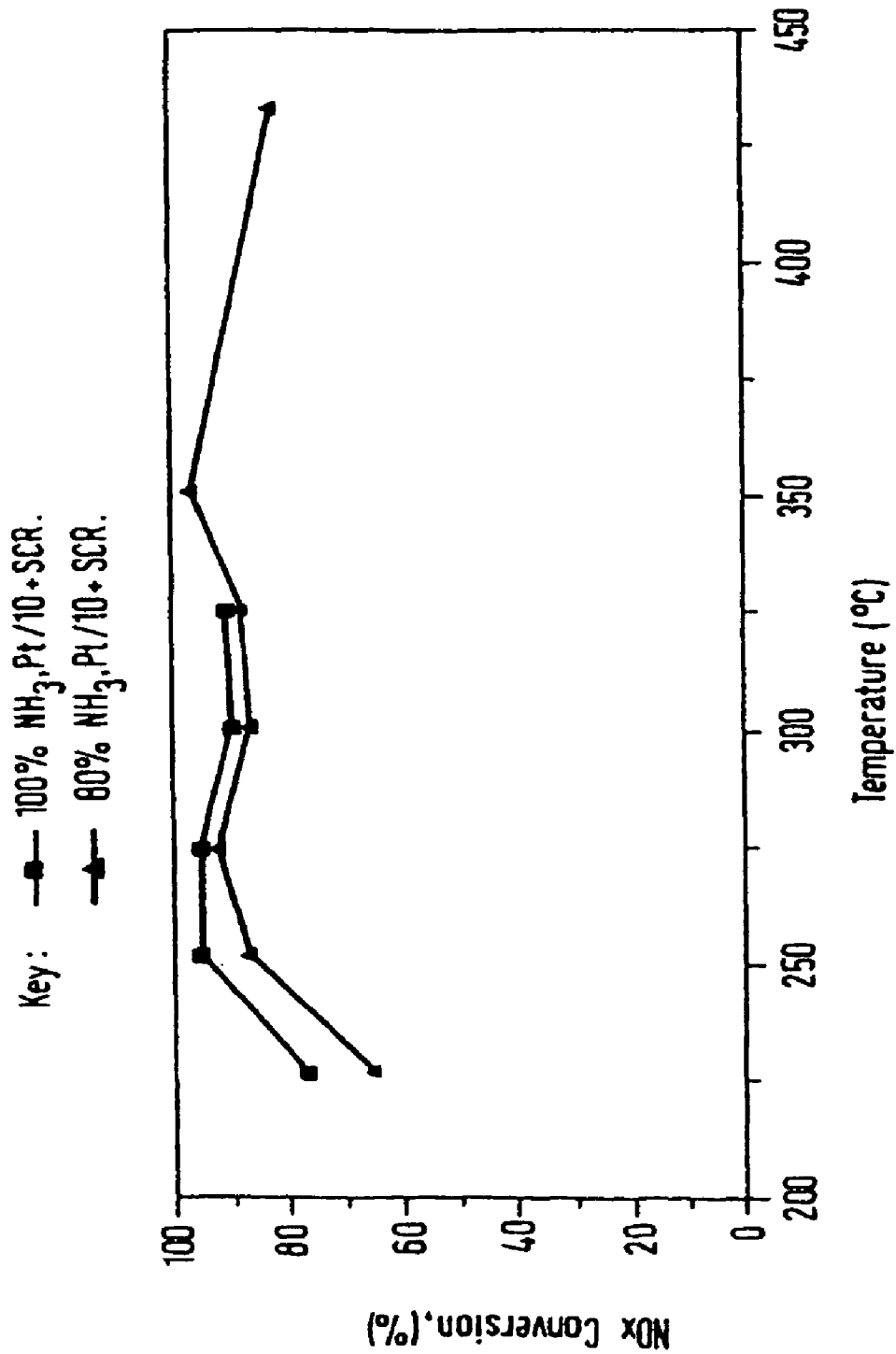
FIG. 2 is a graph plotting percentage $NO_x$ conversion against temperature resulting from Test 2.

The test rig was modified by inserting into the exhaust pipe upstream of the $NH_3$ injection, a commercial platinum oxidation catalyst of 10.5 inch diameter and 6 inch length (26.67 cm diameter and 15.24 cm length) containing log $Pt/ft^3$ (=0.35 g/litre) of catalyst volume. Identical tests were run, and it was observed from the results plotted in FIG. 2, that even at 225° C., the conversion of $NO_x$ has increased from 25% to >60%. The greatest conversions were in excess of 95%. No slippage of $NH_3$ was observed in this test nor in the following test.

Test 3

Figure 3:
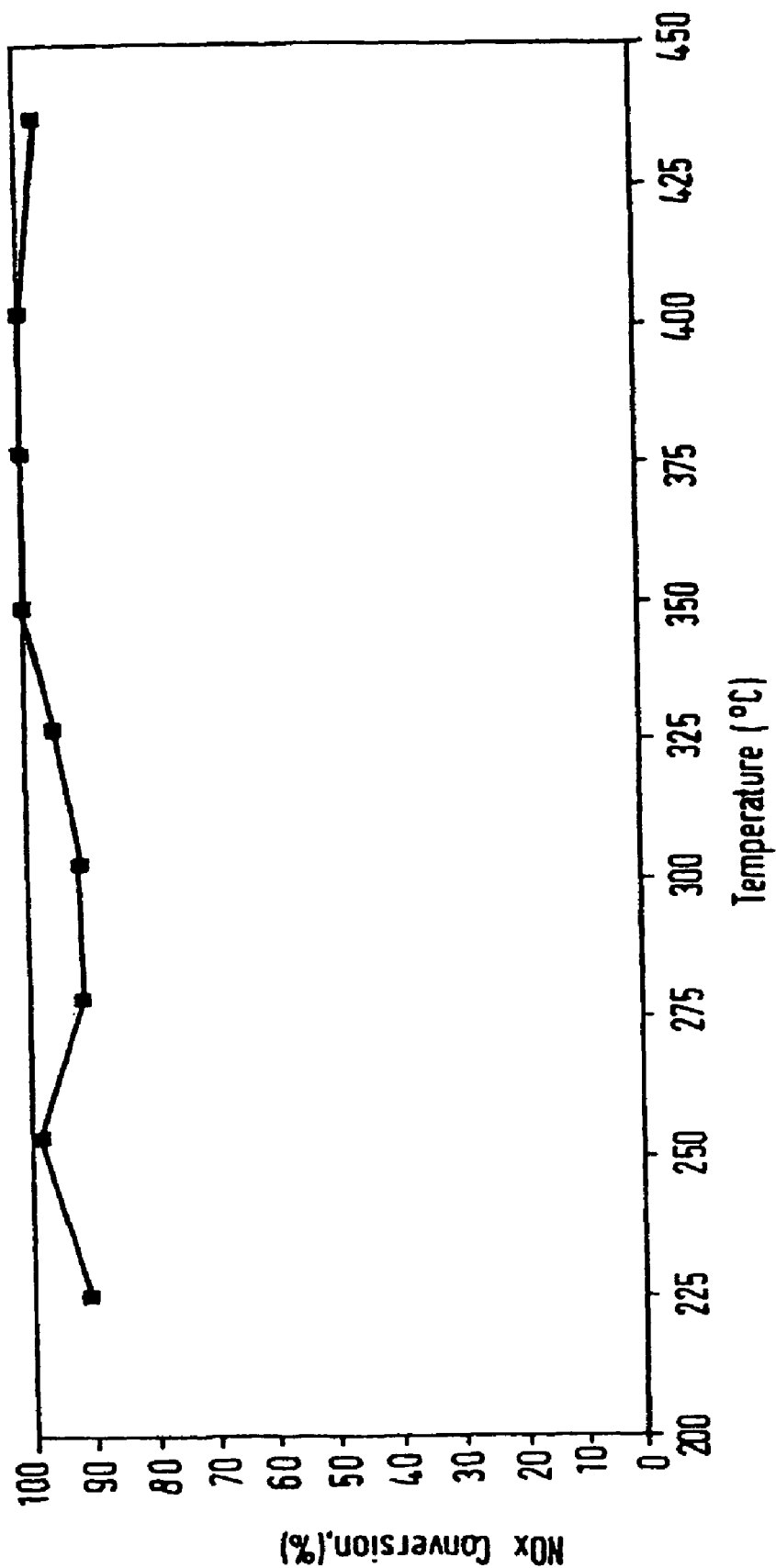
FIG. 3 is a graph plotting percentage $NO_x$ conversion against temperature resulting from Test 3.

The test rig was modified further, by inserting a particulate trap before the $NH_3$ injection point, and the tests run again under the same conditions at 100% $NH_3$ injection and a space velocity in the range 40,000 to 70,000 hr −1 over the SCR catalyst. The results are plotted and shown in FIG. 3. Surprisingly, there is a dramatic improvement in $NO_x$ conversion, to above 90% at 225° C., and reaching 100% at 350° C. Additionally, of course, the particulates which are the most visible pollutant from diesel engines, are also controlled.

Test 4

Figure 4:
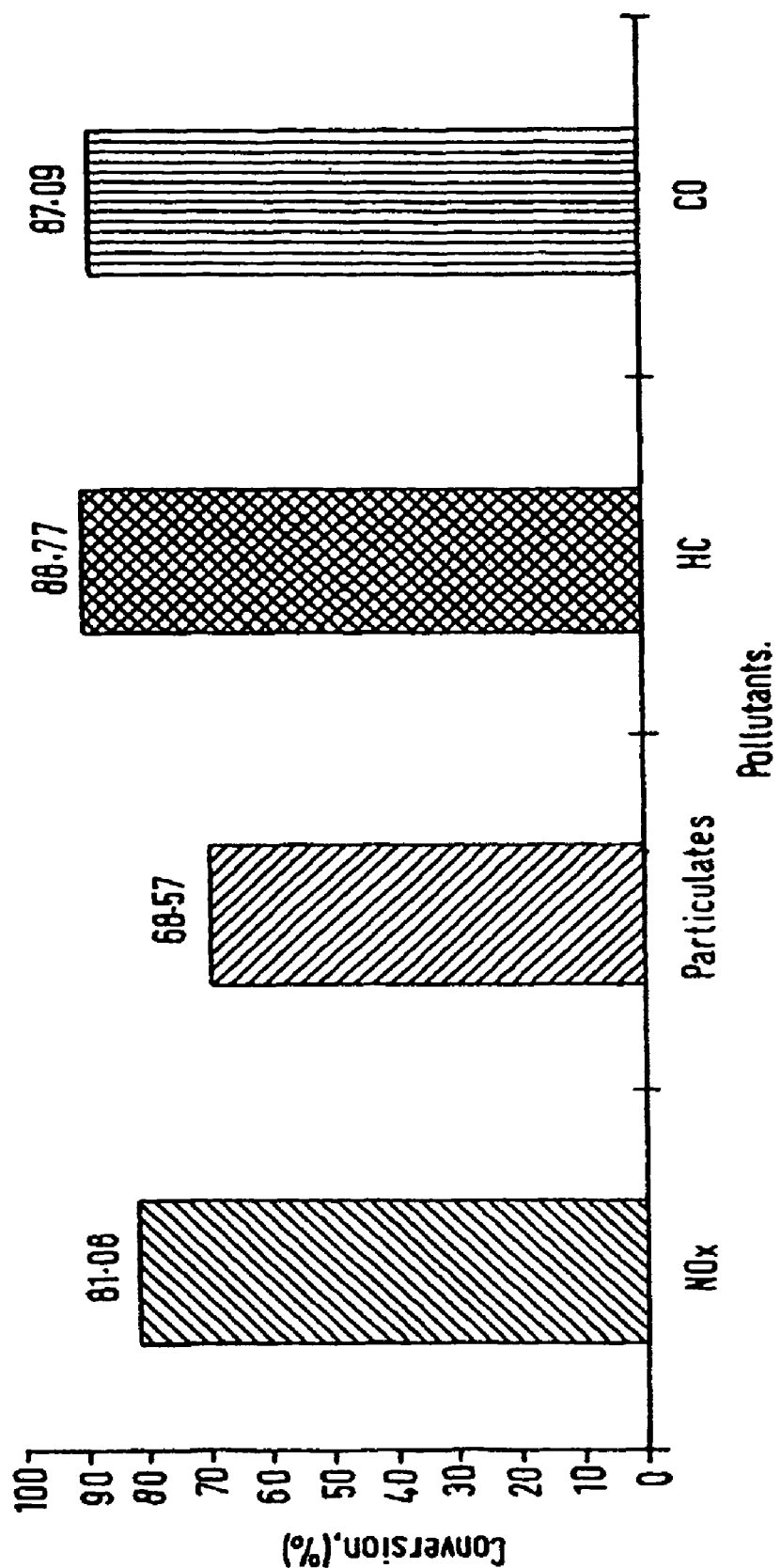
FIG. 4 is a bar graph showing percentage conversion of pollutants [$NO_x$, particulates, hydrocarbons (HC) and carbon monoxide (CO)] resulting from Test 4.

An R49 test with 80% $NH_3$ injection was carried out over a $V_2O_5/WO_3/TiO_2$ SCR catalyst. This gave 67% particulate, 89% HC and 87% $NO_x$ conversion; the results are plotted in FIG. 4.

Additionally tests have been carried out with a different diesel engine, and the excellent results illustrated in Tests 3 and 4 above have been confirmed.

The results have been confirmed also for a non-vanadium SCR catalyst.

What is claimed is:

1. A method of reducing pollutants, including particulates and $NO_x$, in a gas stream, comprising, in order:
   passing the gas stream over an oxidation catalyst under conditions effective to convert at least a portion of NO in the gas stream to $NO_2$ thereby enhancing the $NO_2$ content of the gas stream;
   removing at least a portion of the particulates from the gas stream in a particulate trap;

reacting trapped particulates with $NO_2$, whereby the resulting gas stream has a ratio of NO to $NO_2$ of from about 4:1 to 1:3 by volume;

adding reductant fluid to the gas stream to form a gas mixture downstream of the trap; and passing the gas mixture over an SCR catalyst under NO reduction conditions.

2. The method of claim 1, wherein the particulates are removed without causing accumulation and resulting blockage and back pressure problems.

3. The method of claim 1, wherein the particles are removed from the particulate trap by combustion in the presence of $NO_2$.

4. The method of claim 1, wherein the particulate trap comprises a wall-flow filter.

5. The method of claim 1, wherein the particulate trap is manufactured from ceramic.

6. The method of claim 1, wherein the particulate trap is Manufactured from woven knitted heat resistant fabrics.

7. The method of claim 1, wherein the particulate trap is Manufactured from non-woven heat resistant fabrics.

8. The method of claim 1, wherein the gas stream comprises exhaust from sources selected from the group consisting of: heavy duty diesel engines, light duty diesel engines, gasoline direct injection engines, compressed natural gas engines, ships, and stationary sources.

9. The method of claim 8, wherein the gas stream comprises exhaust from a heavy duty diesel engine.

10. The method of claim 8, wherein the gas stream comprises exhaust from a light duty diesel engine.

11. The method of claim 8, wherein the gas stream comprises exhaust from a gasoline direct injection engine.

12. The method of claim 1, wherein the SCR catalyst is selected from the group consisting of transition metal/zeolite catalysts, rare earth-based catalysts and transition metal catalysts.

13. The method of claim 1, wherein the SCR catalyst comprises a transition metal/zeolite catalyst.

14. A method according to claim 1, wherein the NO to $NO_2$ ratio of the gas mixture is adjusted to a level pre-determined to be optimum for the SCR catalyst, by oxidation of NO over the oxidation catalyst.

15. A method according to claim 1, wherein the SCR catalyst is maintained at a temperature from 160° C. to 450° C.

16. The method of claim 1, wherein the reductant fluid being added to the gas stream prior to entering the SCR catalyst is urea.

17. Method according to claim 1, wherein $NH_3$ or derivatives thereof which pass unreacted or as by-products through the SCR catalyst are removed by means of a clean-up catalyst arranged downstream of the SCR catalyst.

\* \* \* \* \*